(12) United States Patent
Tani

(10) Patent No.: US 7,894,099 B2
(45) Date of Patent: *Feb. 22, 2011

(54) METHOD OF EXPRESSION, RECORDING, REPRODUCTION, AND COMMUNICATION OF COMPUTER OBJECT USING COLOR, APPARATUS FOR RECORDING AND/OR REPRODUCTION, RECORDING MEDIUM, AND METHOD OF PREPARATION OF CODE

(75) Inventor: Okie Tani, Tokyo (JP)

(73) Assignee: Tani Electronics Corporation, Tokyo (JP)

( * ) Notice: Subject to any disclaimer, the term of this patent is extended or adjusted under 35 U.S.C. 154(b) by 232 days.

This patent is subject to a terminal disclaimer.

(21) Appl. No.: 12/230,678

(22) Filed: Sep. 3, 2008

(65) Prior Publication Data

US 2009/0080026 A1 Mar. 26, 2009

Related U.S. Application Data

(62) Division of application No. 11/320,585, filed on Dec. 30, 2005, now Pat. No. 7,656,555, which is a division of application No. 09/720,718, filed as application No. PCT/JP00/03315 on May 24, 2000, now Pat. No. 7,006,248.

(30) Foreign Application Priority Data

May 24, 1999 (JP) ................................. 11-182235

(51) Int. Cl.
*G06K 1/00* (2006.01)
*G06K 15/00* (2006.01)
*G06K 19/06* (2006.01)
*G06F 15/16* (2006.01)

(52) U.S. Cl. ....................... 358/1.9; 358/3.28; 358/1.15; 235/469; 235/494

(58) Field of Classification Search .................. 358/1.9, 358/2.1, 3.28, 1.15, 1.18, 539; 235/469, 235/494; 283/114; 715/207
See application file for complete search history.

(56) References Cited

U.S. PATENT DOCUMENTS

| 4,488,679 | A | 12/1984 | Bockholt et al. |
| 5,369,261 | A | 11/1994 | Shamir |
| 5,665,951 | A | 9/1997 | Newman et al. |
| 5,869,828 | A | 2/1999 | Braginsky |
| 5,918,238 | A | 6/1999 | Hayashi |
| 6,762,770 | B1 | 7/2004 | Opstad et al. |
| 2008/0034431 | A1 | 2/2008 | Mergen |

FOREIGN PATENT DOCUMENTS

| CN | 1238602 A | 3/1999 |
| EP | 1 100 037 A1 | 5/2001 |
| GB | 1 563 609 | 3/1980 |

(Continued)

*Primary Examiner*—Scott A Rogers
(74) *Attorney, Agent, or Firm*—Oliff & Berridge, PLC

(57) ABSTRACT

A computer object such as text, graphics, mathematical formulas, images, audio, and other data and information handled inside a computer or through a computer in industry or daily life etc. is expressed, recorded, reproduced, and transmitted using color or a color numerical value. Color is used as a medium for expressing data or information taking note of the characteristics of color. This helps counter the ballooning amount of recording. Color can also be used to prepare codes.

5 Claims, 11 Drawing Sheets

FOREIGN PATENT DOCUMENTS

| | | |
|---|---|---|
| JP | A-54-130975 | 10/1979 |
| JP | 57-161068 | 1/1982 |
| JP | 03154181 | 7/1991 |
| JP | EP 0 487 329 A2 | 5/1992 |
| JP | A-04-354086 | 12/1992 |
| JP | A-05-242287 | 9/1993 |
| JP | A-6-231466 | 8/1994 |
| JP | U-3012625 | 4/1995 |
| JP | A-8-30977 | 2/1996 |
| JP | 08-096097 | 4/1996 |
| JP | 09-152851 | 6/1997 |
| JP | A-10-055420 | 2/1998 |

FIG.2

| COLOR | COMPUTER OBJECT |
|---|---|
| ⋮ | (OMITTED) |
| RED 1 | "T" |
| RED 2 | "TANI" |
| ⋮ | (OMITTED) |
| ORANGE 1 | "TANI ELECTRIC INDUSTRY CO., LTD." |
| ORANGE 2 | CREAM SOLDER PRINTER DESIGN DRAWING ABC002 |
| ORANGE 3 | CREAM SOLDER PRINTER SOFTWARE DEF876 |
| ⋮ | (OMITTED) |
| YELLOW GREEN 1 | CREAM SOLDER PRINTER EXTERNAL PHOTO IHG55 |
| YELLOW GREEN 2 | CREAM SOLDER PRINTER APPLICATION DOCUMENT DEF04 |
| ⋮ | (OMITTED) |
| VIOLET 1 | CREAM SOLDER PRINTER INSTURCTION AUDIO |
| VIOLET 2 | CREAM SOLDER PRINTER INSTURCTION VIDEO |
| ⋮ | (OMITTED) |

FIG.3

COLOR-Color numerical value CORRESPONDENCE TABLE

| COLOR | Color numerical value |
|---|---|
| ⋮ | (OMITTED) |
| RED 1 | 84 |
| RED 2 | 85 |
| ⋮ | (OMITTED) |
| ORANGE 1 | 143 |
| ORANGE 2 | 144 |
| ORANGE 3 | 145 |
| ⋮ | (OMITTED) |
| YELLOW GREEN 1 | 201 |
| YELLOW GREEN 2 | 202 |
| ⋮ | (OMITTED) |
| VIOLET 1 | 235 |
| VIOLET 2 | 236 |
| ⋮ | (OMITTED) |

FIG.4

102 COLOR-Color numerical value-OBJECT CORRESPONDENCE TABLE

| Color numerical value | COMPUTER OBJECT |
|---|---|
| · · · | (OMITTED) |
| 84 | "T" |
| 85 | "TANI" |
| · · · | (OMITTED) |
| 143 | "TANI ELECTRIC INDUSTRY CO., LTD." |
| 144 | CREAM SOLDER PRINTER DESIGN DRAWING ABC002 |
| 145 | CREAM SOLDER PRINTER SOFTWARE DEF876 |
| · · · | (OMITTED) |
| 201 | CREAM SOLDER PRINTER EXTERNAL PHOTO IHG55 |
| 202 | CREAM SOLDER PRINTER APPLICATION DOCUMENT DEF04 |
| · · · | (OMITTED) |
| 235 | CREAM SOLDER PRINTER INSTURCTION AUDIO |
| 235 | CREAM SOLDER PRINTER INSTURCTION VIDEO |
| · · · | (OMITTED) |

102a, 102b

PLURALITY OF COLOR NUMERARICAL VALUE-OBJECT CORRESPONDENCE TABLES

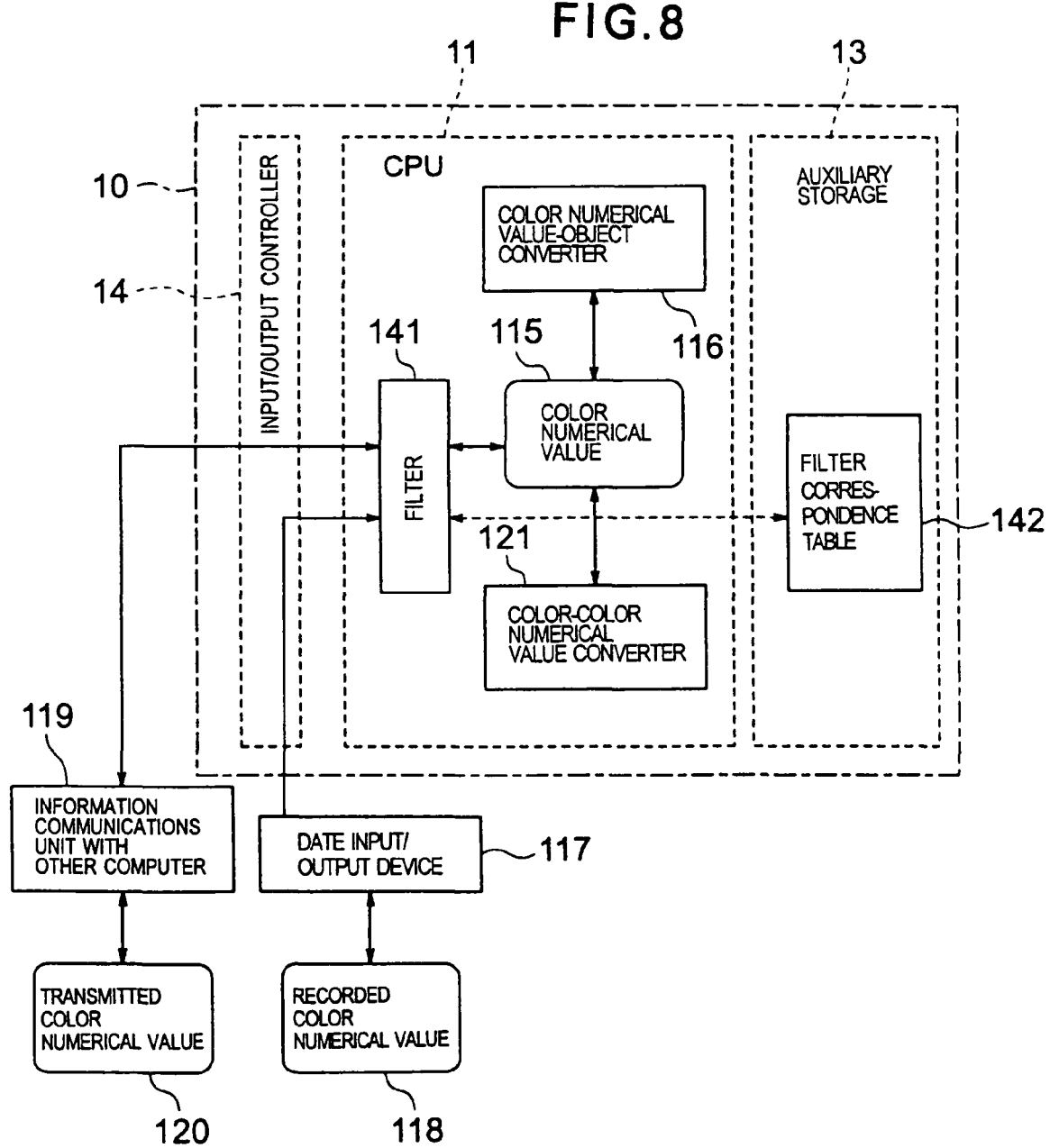

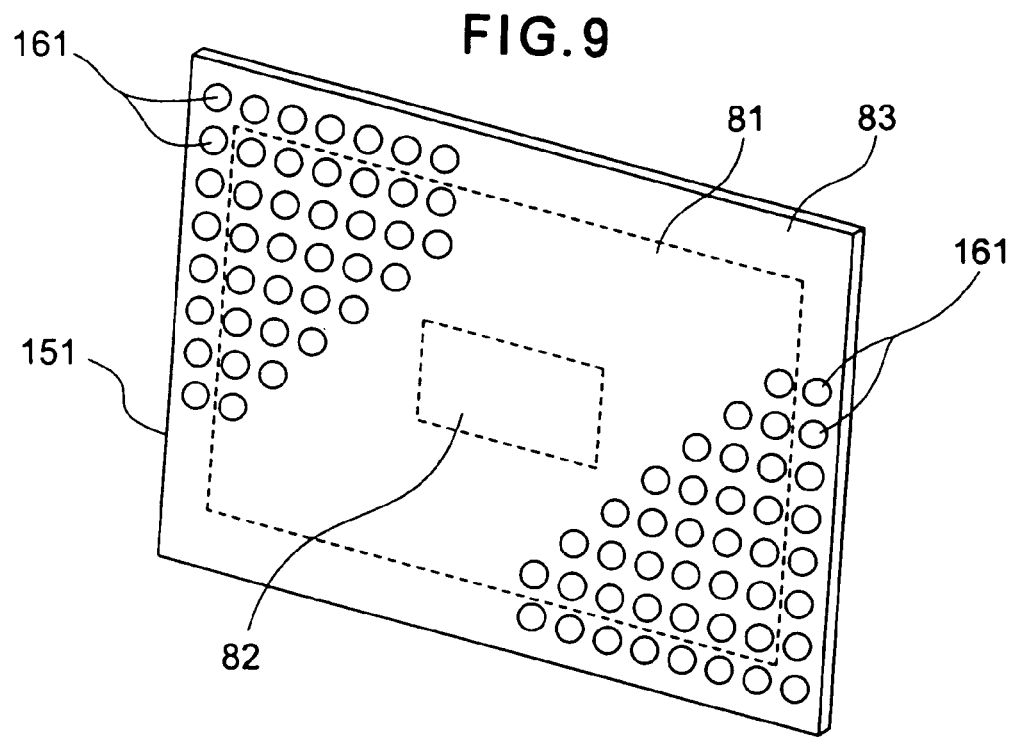
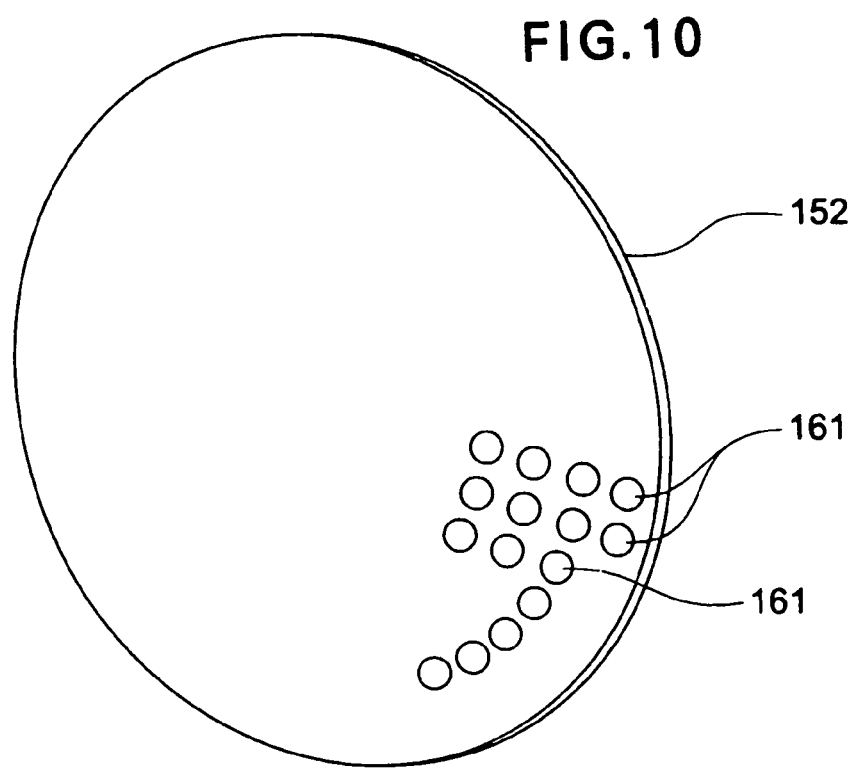

METHOD OF EXPRESSION, RECORDING, REPRODUCTION, AND COMMUNICATION OF COMPUTER OBJECT USING COLOR, APPARATUS FOR RECORDING AND/OR REPRODUCTION, RECORDING MEDIUM, AND METHOD OF PREPARATION OF CODE

This is a Division of application Ser. No. 11/320,585 filed Dec. 30, 2005, which is a Division of application Ser. No. 09/720,718 filed Dec. 28, 2000, now U.S. Pat. No. 7,006,248, which claims the benefit of PCT/JP00/03315 filed May 24, 2000. The entire disclosures of the prior applications are hereby incorporated by reference herein in their entirety.

BACKGROUND

The present invention relates to a method of expression, recording or storage, reproduction, and communication, using color, for alphanumerics, graphics, mathematical formulas, images, sound, and other data or information handled involving a computer in industry, daily life, etc., an apparatus for recording and/or reproduction, a recording medium using color, and a method of preparation of a code using color.

As conventional methods for recording various types of information, the method of direct recording on paper, the method of recording on floppy disks, hard disks, compact disks (CDs), digital versatile disks (DVDs), and other recording media involving computers, etc. are known. Recently, along with the spread of the computer, much use has particularly been made of such recording media.

As a method of recording several types of information on a printed circuit board, on the other hand, there is the method of displaying dots at suitable locations on the printed circuit board and recording small amounts of information by the combination of these dots. Other methods of recording information on printed circuit boards include the method using bar codes, the method of stamping printed circuit boards with dot or check patterns, and the method of combining these. In these cases, the recorded information is expressed by images comprised of the dots, lines, patterns, or combinations of the same or the positions of the dots, lines, etc.

Along with the spread of the computer, the main method for recording information has become recording information on recording media converted to a binary format. Great strides have been made in such recording media along with the rapid advances made in computer hardware and software. The method of recording information on a recording medium is now basically to link 1 bit of information with the smallest recording unit on the recording medium (hereinafter referred to as "1 dot", the location where the smallest recording unit is recorded also being referred to as a "dot"). With the skyrocketing amount of information for recording in recent years, therefore, the recording capacity of recording media is rapidly being used up.

The main object of the present invention, in view of the problem of the limited recording capacity and taking note of the characteristic of color, is to provide a method of expression of a computer object using color as a medium for expressing data or information and linking the type or difference of color printed on a dot with a plurality of data etc, and thereby increasing the amount of information per dot to an amount more than 1 bit (for example, 2 bits, 8 bits, 16 bits, etc.) and thereby overcoming the limitation in the recording (or storage) capacity.

Another object of the present invention is to provide a method of recording, reproduction, and communication of a computer object using the method of expression of a computer object using color.

Still another object of the present invention is to provide an apparatus for recording and/or reproduction of a computer object comprised by using the method of expression of a computer object using color.

Still another object of the present invention is to provide a method and apparatus for recording a large amount of data or information using general paper, plastic, or other inexpensive recording media.

Still another object of the present invention is to provide a recording medium using the method of recording data or information using color.

A still further object of the present invention is to provide a method of preparation of a code using recording of data or information using color.

A further object of the present invention is to provide a method and apparatus enabling transmission of a large amount of information by applying the recording of data or information using color as explained above to a communications line and communications apparatus.

DISCLOSURE OF THE INVENTION

In the present invention, the concepts of color, a color entity, computer object, etc. will be used in the following explanation.

Current computers can recognize over several million types of printable color. Therefore, the inventors propose the technical idea of using color to express data or information.

Here, "color" in principle is a physical manifestation which an ordinary person can visually recognize under visible light. It further is assumed to include in concept a physical manifestation under light of a frequency other than visible light so as to include recognition by a computer.

A computer object is linked with each of the plurality of colors. Here, a "computer object" means an alphanumeric, symbol, graphic, mathematical formula, image, sound, or other data or information (hereinafter referred to as "data/information" in accordance with need) handled inside or through a computer. Such a computer object is recorded by printing the corresponding color on a dot of the recording medium. That is, by recording color on a recording medium, it becomes possible to simultaneously store the computer object. Here, the substance printed with a dot of a recording medium using color as an attribute is referred to as a "color entity".

As explained above, the computer object is recorded by the color of the color entity. To realize the above recording, the method of expression of the computer object using color becomes important. The present invention proposes such a method of expression of a computer object using color. Various methods of recording (storage), reproduction, and communications are realized according to the present invention based on this method of expression of a computer object. Further, an apparatus for recording and/or reproduction using the method of expression of a computer object is proposed according to the present invention. Further, a method of preparation of a code using the method of expression of a computer object is proposed according to the present invention.

Further, when recording data/information on a medium on which color cannot be directly recorded (for example, a computer disk) or in communication, the computer object is transmitted using a color numerical value corresponding to the color.

Based on the above idea, color is linked with a computer object and a plurality of computer objects are expressed by different colors.

As explained above, a different color is linked with each of the plurality of computer objects handled inside a computer or through a computer. This linked relation between a color and computer object will be referred to as a "color-object relation". A substance having as an attribute the color printed on one or more dots (hereinafter referred to as "color dots") of a recording medium (that is, a color entity) may therefore be used to express a corresponding computer object. A recording medium on which a color entity expressing a computer object is recorded may be made of, for example, paper, plastic, glass, wood, ceramic, a sheet, liquid crystal panel, a medium able to be recorded with color, and combinations of the same.

Using the above method of expression (or method of recording) of a computer object according to the present invention, an apparatus for recording a computer object expressed using color may be constructed. This recording apparatus may include a CPU (central processing unit), color output device, and storage storing the necessary data or program (main storage or auxiliary storage). This apparatus for recording a computer object converts the computer object to a color for recording. That is, in the apparatus for recording a computer object, the CPU converts a computer object to a color based on a predetermined color-object relation when there is a command to record a certain computer object. Further, the CPU sends a color output instruction to the color output device. The color output device outputs and records the color entity on a recording medium in accordance with this color output instruction. The color output device is a color printer etc.

Using the above method of expression (or method of reproduction) of a computer object according to the present invention, an apparatus for reproduction of a color object expressed using color may be constructed. This reproduction apparatus includes a CPU, color input device, and storage for storing the necessary data or program. The apparatus for reproduction of a computer object converts color to a computer object for reproduction. That is, in the apparatus for reproduction of a computer object, the color input device reads the color of a color dot on the recording medium. The color input device includes a CCD camera, camera scanner, etc. The CPU regenerates the computer object from the input color based on the color-object relation. Further, the CPU displays the regenerated computer object, outputs it as sound, outputs it as an image, prints it, stores it, or transmits it.

It is also possible to combine an apparatus for recording and an apparatus for reproducing a computer object to realize an apparatus for recording and reproducing a computer object.

In the above configuration, instead of color, it is also possible to link a different numerical value (this numerical value being referred to as a "color numerical value") with each computer object (the relationship of the linked color numerical values and computer objects being referred to as "color numerical value-object relation") and use this to express a computer object.

It is also possible to assign a color to a color numerical value (the relation between colors and color numerical values being referred to as a "color-color numerical value relation") and use both of the color numerical value-object relation and color-color numerical value relation to link a computer object with a color.

When converting a computer object to a color or converting a color to a computer object, it is also possible to construct a recording apparatus or a reproduction apparatus using both the color-color numerical value relation and the color numerical value-object relation instead of the color-object relation.

It is further possible to use the corresponding color numerical value rather than the color and transmit the same over a network or transmit the same among a plurality of computers by transfer by a data storage medium and to use the received color numerical value to regenerate the computer object in accordance with need using the color numerical value-object relation and thereby keep from handling a computer object itself on a communications path or data transfer path.

In the method of expression, method of recording, etc. of the computer object and recording apparatus etc., the method of setting a color numerical value is preferably to determine a maximum allowable range of number of elements of a color numerical value taking into consideration the reproducibility of color and set a color numerical value within that range.

The method of establishing a plurality of computer object groups, preparing color numerical value-object relations having different correspondences for each, and arranging all of the computer objects handled in the plurality of computer object groups has been proposed. At this time, to identify a computer object group, it is sufficient to assign a color numerical value (inevitably a color) to each group. This method is useful for facilitating the arrangement of computer objects and effective when the number of computer objects handled exceeds the maximum allowable range of the number of elements of the color numerical value.

When referring to the plurality of computer object groups as first hierarchal groups and the number of the first hierarchal groups becomes larger, the first hierarchal groups are divided to create a plurality of second hierarchal groups and the first hierarchal groups are included in the second hierarchal groups. Further, similarly, the method of preparing a third hierarchy, fourth hierarchy, and the like and linking a color numerical value with each of these hierarchies of groups is proposed. Due to this, it becomes possible to more flexibly arrange computer objects and link any number of computer objects, no matter how many, to a finite number of colors.

When converting a computer object to a color numerical value, converting the color numerical value to a color, and converting the color to a computer object, the color numerical value-object relation, color-color numerical value relation, and color-object relation (these three types of relations relating to a computer object meeting these conditions being referred to all together as the "cyclic object relation") are set so that a computer object after conversion becomes the same as the computer object before conversion.

The method is also proposed of, when converting a computer object to color or a color numerical value and transmitting, transferring, or recording (storing) the same, simultaneously transmitting, transferring, and recording (storing) the one or more correspondences of the cyclic object relation required for regeneration of the computer object so that even when the receiving side does not have the relation for regeneration of the computer object, the received color numerical value can be regenerated to the computer object.

In the method of expression of a computer object according to the present invention, an elemental computer object enabling expression of all sorts of computer objects included in any hierarchy of group by combinations thereof (for example, an alphanumeric or Japanese character defined by the JIS code or something used in common as an element of a computer object inside a computer group, such a computer object being called a "common object") are set. It is possible to express a series of computer objects by a common object.

A color-object relation, color numerical value-object relation, and color-color numerical value relation are set among the common objects and colors and color numerical values corresponding to the same (these being called "common colors" and "common color numerical values") (these relation relating to common objects being together called "common object relations"). This enables a series of computer objects to be transmitted, transferred, recorded, and regenerated (reproduced) using only a common color numerical value or common color.

The method has also been proposed of simultaneously adding a common object relation when transmitting, transferring, and recording a computer object using a common color or common color numerical value.

The cyclic object relations include common object relations. Using this, a series of computer objects may be converted to color numerical values or colors and transmitted, transferred, recorded (stored), and regenerated (reproduced).

The method of recording a computer object and recording apparatus thereof assigns addresses to the recording surface of the recording medium for the output of the color dots and arranges the colors dots in accordance with those addresses.

In the above, it is preferably made possible to designate the order of output and input of color dots by addresses.

In the method of reproduction of a computer object or reproduction apparatus according to the present invention, it is possible to make the shape of the recording medium or the shape of the arrangement of color dots for output on the same a disk shape, square shape, or other polygonal shape or any other shape. The recording medium may be made any composition and the color dot output surface of the storage medium may be made rotatable or movable in any direction. Further, the color entity output surface of the storage medium may be made movable or stoppable. Further, the recording medium may be made detachable or may be held to enable driving, rotation, stopping, etc. Further, the holder of the recording medium may be made rotatable and the color dots may be made inputtable or outputtable along with rotation of the holder.

The above recording medium may be prevented from discoloration of the color entity by a coating etc.

The linkage in the color-object relation may be based on the communications line and communications apparatus.

The color dots may be arranged by dividing the color dot output surface (display surface) of the recording medium into a control area, storage area, security area, and other areas. The areas may be freely set up.

The above configuration enables color dot data to be transmitted two way and enables recording of data relating to the color dots or checking and updating of the content of transmission.

In the transmission, transfer, recording, and reproduction of a computer object using the method of recording, method of reproduction, recording apparatus, reproduction apparatus, and recording/reproduction apparatus of a computer object according to the present invention, all or a specific part of the series of input colors or color numerical values may be used to judge if acceptance is possible and perform different processing when acceptance is not possible and when acceptance is possible (this processing is referred to as a "color filter").

The above color filter may be provided with a list of colors or color numerical values (this list called a "filter correspondence table") and compare an input color or color numerical value against the filter correspondence table to judge whether acceptance is possible.

The above color filter may function to display data for deciding on processing when judging whether acceptance is possible for a series of colors or color numerical values or to return data by transmission, transfer, and reproduction or other perform other processing.

The method and apparatus for recording a computer object according to the present invention may also comprise assigning a specific function to one or more specific colors based on a color-object relation or independent from a color-object relation to give a function of designating a computer object group hierarchy, a function of judgement and checking before converting a color entity to a computer object, a security function, etc.

The method may further comprise using a specific color for correcting a change in color over time or correcting a difference in characteristics of input or output of color between color input/output devices. For example, it is possible to assign one or more color information to one specific color and output the designated plurality of colors after a color entity as color entities. By doing this, the side receiving the color entity as input can read one or more corrective color entities from information designated by a specific color and correct the difference in color due to aging or differences in hardware by the difference in color information designated for the read color and specific color.

In the above explanation, only color was used as the attribute of a color entity, but it is also possible to use attributes other than color. That is, it is possible to provide a method of expression of a computer object, method of recording, method of reproduction, method of communication, recording apparatus, reproduction apparatus, or recording and reproduction apparatus linking one or more attributes selected from the group of shapes of circles, squares, bars, and other graphics or other printable characteristics in addition to color as attributes of color entities (these attributes being referred to as "general colors"). When using such composite attributes, color numerical values may be assigned and cyclic object relations established.

It is also possible to mix on a single recording medium (for example, paper) a recording of computer objects by color entities or color numerical values and a recording of computer objects not based on the same, for example, ordinary alphanumerics etc.

Further, it is also possible to record a single computer object using a plurality of color dots arranged continuously or in any pattern on a recording medium. By establishing a color-object relation or a color-color numerical value relation linking one computer object or color numerical value to a combination of a plurality of different general colors, it becomes possible to record one computer object for a plurality of color dots arranged continuously or in any pattern on a recording medium.

In some cases, there are color entities or color numerical values output in advance or for which output is determined and computer objects are linked with these colors or color numerical values later. In this case, a new color-object relation or color numerical value-object relation may be established and the relation used at the time of input of colors or color numerical values.

The following effects are obtained by the method and apparatus for expressing a computer object and recording a computer object using a color or a color entity having a general color as an attribute.

It is possible to make the recording capacity of each dot one of a plurality of dots up to the limit of the resolution and precision of printing and reading of color and to thereby increase the recording capacity (storage capacity). It is possible to link various types of information such as alphanumerics, symbols, graphics, mathematical formulas, images, and audio with each dot. A considerable amount of information can therefore be recorded and stored in a handy space. The available selection of recording media also becomes broader and the recording media become inexpensive. It further becomes possible to simplify the hardware and system for recording and reproduction. Further, recording by a combination of colors facilitates the recording and control of a large amount of information. There is an equivalent action of compression of data in the transfer and transmission of information and the storage of books and other publications. Since information can be recorded on paper etc. by the use of a mounting fixture, entertainment software and software for daily life can be prepared simply and inexpensively. Therefore, it is possible to replace expensive large capacity storage devices. At the same time, the invention is environmentally friendly and energy saving in action.

The above method of expression of a computer object, method of recording, method of reproduction, and method of communication can be further developed and used as a method of preparing a code. By expressing information by colors or color numerical values and transmitting information as color numerical values, it becomes possible to transmit a large amount of information, achieve the function of a code, and increase the security of the information in the middle of transmission. In preparing the codes, the information is expressed by assigning addresses to the recording surface of the recording medium on which the color is printed and expressing the information with the color by designating an order of output and input of color entities by the addresses.

Since ordinary symbols, colors and color numerical values are selectively used, it becomes possible to reduce the amount of dots used. Use of the correspondence table enables the colors and color numerical values transmitted and transferred for computer objects to be reduced.

BRIEF DESCRIPTION OF THE DRAWINGS

FIG. 2 is a view of an example of the relationship between color and a computer object by a correspondence table;

FIG. 3 is a view of an example of the relationship between color and a color numerical value by a correspondence table;

FIG. 4 is a view of an example of the relationship between a color numerical value and object by a correspondence table;

FIG. 8 is a block diagram of the configuration for selection by a color filter;

FIG. 9 is a view of an example of a square recording media displaying a color entity on one surface and display elements;

FIG. 10 is a view of an example of a circular recording medium displaying a color entity on one surface and display elements;

BEST MODE FOR CARRYING OUT THE INVENTION

Next, an explanation will be given of embodiments of the present invention based on the attached drawings. The content of the present invention will be made clearer by this description.

Figure 1:
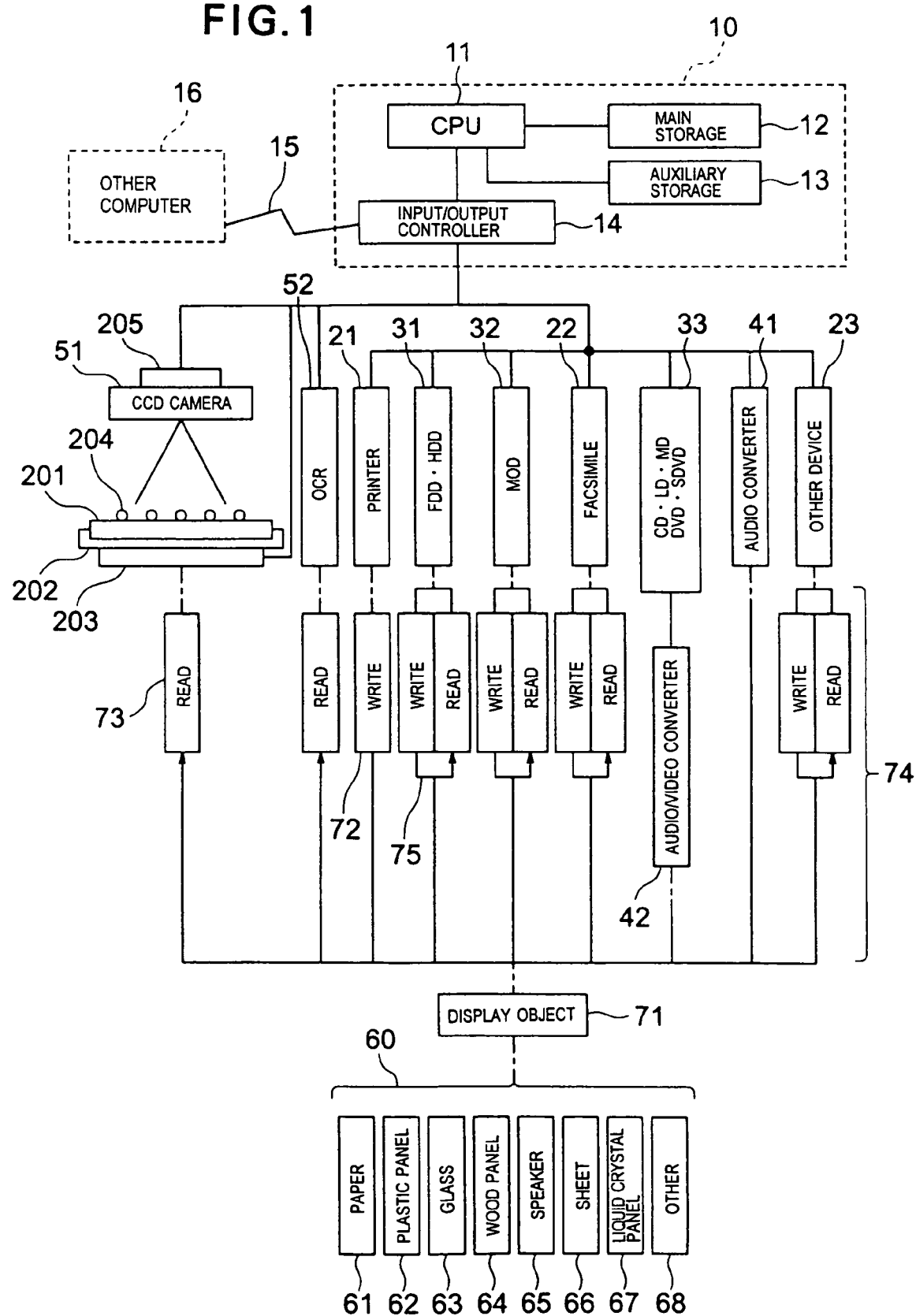
FIG. 1 shows an example of the configuration of a computer system to which the method of the present invention for expressing a computer object using color is applied and shows the relationship between a color entity and recording of a display object.

FIG. 1 shows a basic embodiment of the present invention. The apparatus according to this embodiment (conceptually including all apparatuses for recording and/or reproduction, that is, a recording apparatus, reproduction device, and recording and reproduction apparatus) shows an example of the computer system to which the method according to the present invention for expressing a computer object using color is applied. The block 10 shown by broken lines shows a computer. The computer 10 is provided with an input device and output device (or input/output device) explained later. The system based around the computer 10 realizes overall a specific function like for example a printer.

The computer 10 is comprised of a CPU (central processing unit) 11, main storage 12, auxiliary storage 13, and input/output controller 14. The computer 10 does not have to be a computer designed especially for the present invention. Further, the computer does not have to be a separate, independent unit. In the case of the present embodiment, for example, the computer 10 is built into a printer. Further, it is possible to give part of the computer or MPU built into the printer the function of using the method of expression of a computer object using color according to the present invention and thereby record or store, reproduce, transmit (transfer), or otherwise process a computer object by color. The CPU 11 has the function of converting the computer object to color and outputting it through the output device or conversely regenerate a color read through the input device into a computer object. This function is realized by providing the main storage 12 or auxiliary storage 13 with a table having the correspondence between a plurality of computer objects and a plurality of colors and a program executing the conversion and input/output processing while referring to the table. Instead of the colors, it is also possible to use color numerical values corresponding to the colors. The auxiliary storage 13 stores the computer objects and stores the color-object relation (or alternatively the color-color numerical value relation or color numerical value-object relation) as a data base or other similar format. The auxiliary storage 13 may be built into the computer 10 as illustrated or may be provided external to the computer 10. Further, the auxiliary storage 13 may be constructed to be outside of the computer 10 and connected only at the time of use. The input/output controller 14 selects one of the plurality of input devices and plurality of output devices connected to the computer 10 and controls the input/output processing of the same. Further, the computer 10 is connected to another computer 16 through the input/output controller 14 or through a communications device (including communications line) 15. Therefore, the input/output controller 14 has the function of selecting the communication device 15 and communicating with the other computer 16 through the communication device in accordance with an instruction for communication of the CPU 11. In FIG. 1, the communication device 15 is shown conceptually by a line, but includes a means having a communications function.

In the above, the transfer between the input/output controller 14 and any of the input device, output device, and communications device is not limited in the type of connection such as direct connection or connection through a WAN or LAN or the system of transmission such as wired, wireless, or infrared communications.

The computer 10 may be provided with various types of output devices and input devices or input/output devices.

The output device connected to the computer 10 is for example a device for outputting the color entity, a device for outputting the color numerical value, or a device for outputting a regenerated color object. As a device outputting a color entity, there are printers 21 (color printers), facsimiles 22, and color output devices included in other devices 23. These color entity output devices print the color entity on a recording medium based on an output instruction of the computer 10. Further, as the device for outputting the color numerical value, there are a FDD or HDD 31, MOD 32, CD, LD, MD, DVD, SDVD 33, or storage devices included in devices 23 other than the above. These color numerical value output devices output color numerical values. Further, as devices for outputting regenerated computer objects, there are audio converters 41, audio/video converters 42, etc. in addition to the above output devices. These computer object output devices output computer objects converted from color entities or color numerical values in accordance with the application or purpose.

In the above explanation of an output device, the example of various types of output devices able to be connected to the computer 10 being connected was explained, but there is no need for all of the above output devices to be connected at the computer 10.

The input device connected to the computer 10 is for example a device for input of a color entity, a device for input of a color numerical value, or a device for input of a computer object to be recorded. As a device for input of a color entity, there are a CCD camera 51, OCR 52, the above facsimile 22, and devices able to read color included in other devices 23. These devices read the color of the color entity and input it to the computer 10. As the device for input of a color numerical value, there are the above-mentioned FDD and HDD 31, MOD 32, CD, LD, MD, DVD, and SDVD 33, or storage device included in devices 23 other than the above. These devices read the color numerical values and input them to the computer 10. As a device for inputting a computer object to be recorded, there are, in addition to the above input devices, an audio converter 41 and audio/video converter 42. These devices read a computer object to be recorded into the computer 10.

In the above, a recording medium 201 is arranged under the CCD camera 51. The recording medium 201 is held horizontal by the holding device 202. The holding device 202 is provided with a drive 203 for driving in the horizontal direction. A display object, that is, the color entity 204, is displayed on the recording medium 201. The color entity 204 is captured by the CCD camera 51. Note that the CCD camera 51 is provided with a drive controller 205.

In FIG. 1, the recording medium 60 is shown for the above-mentioned output device, input device, and input/output device. As the recording medium 60, paper (ordinary paper, for example, drawings, books, magazines, newspaper, images, etc.) 61, plastic panel (for example, drawings, books, magazines, newspapers, images, etc.) 62, glass 63, wood panel 64, speakers 65, sheets (for example, cards, negotiable securities, ID certificates, books, etc.) 66, liquid crystal panels (or PDPs, for example, drawings, books, magazines, newspapers, images, etc.) 67, and other recording media similar to the same (other display objects, audio, and video) 68. These recording media record color entities or color numerical values on their surfaces or inside them. In FIG. 1, the recorded color entity or color numerical value is shown as a display object 71 in the recording medium 60. The recording medium 60 functions as a means for recording on its surface or internally a display object 71 by the write operation of the output device in the case of the output device or functions as a means for reading the display object 71 recorded on the surface or internally by the write operation by the input device in the case of the input device. The computer 10 and recording medium 60 is linked by the interaction of reading 73 through the input devices. The area 74 between the computer 10 and recording medium 60 is an area where a relation is formed by writing and reading. In an input/output device function as an output device and input device like an FDD or HDD 31 or facsimile 22, both write and read functions 75 are realized. Further, when using speakers 65, the recording medium 60 is not written for output or read from for input. An audio converter 41 is used.

The recording medium 60 may be used in not only the computer 10 outputting data to the same, but also other computers having similar functions. This enables data to be transferred between computers.

The communications device 15 is a WAN ((including a wide area network or the Internet) using a telephone line etc. or a LAN (local area network). Information on the computer object is transmitted as color numerical values or general data by these communication devices 15 with other computers 16 (or computer systems). In the communication by a communication device 15, it is possible to use any communications path, communications system, or communications device. The present invention is not limited in this respect.

The other computers 16 are not limited to any specific computers. They need only be provided with all or part of the devices for recording (storing) and regenerating computer objects according to the present invention. In the computer 16, it is possible to convert data and information by the color entity or color numerical values according to the present invention.

Next, the method of converting a computer object to a color entity or color numerical value and the method for conversely regenerating a color entity or color numerical value to a computer object will be explained.

The color-object relation is used for converting a computer object to a color. FIG. 2 shows a color-object correspondence table 100 showing an example of the color-object relation and is expressed in the form of a table used specifically in a computer 10. The left column 100a of the color-object correspondence table 100 lists the plurality of different colors used, while the right column 110b lists the computer objects linked with these colors. In this example, the colors RED 1, RED 2, ORANGE 1, ORANGE 2, and ORANGE 3 show different colors. Linked with the colors RED 1, RED 2, ORANGE 1, ORANGE 2, and ORANGE 3 are for example the letter "T", the Sino-Japanese character "TANI", the string of Sino-Japanese characters "Tani Electric Industry Co., Ltd.", a design drawing of a cream solder printer identified by the drawing no. "ABC002", and software used in the cream solder printer identified by the code "DEF876".

In the above color-object relation, there are limits to the resolution of color able to be printed or read. The maximum resolution of color is 65536 assuming a resolution corresponding to 16 bits or just under 17 million assuming a resolution corresponding to 24 bits. On the other hand, the number of computer objects processed by the computer 10 is generally larger than that. At this time, it is sufficient to divide all of the computer objects to be processed into a plurality of groups and to establish a separate color-object correspondence table for each group. Naturally, in these plurality of color-object correspondence tables, the colors are common and only the corresponding computer objects are different. At this time, colors indicating the groups are linked with the color-object correspondence tables. When outputting color entities, both a color showing a group and a separate color showing the computer object are output. In forming the groups, it is preferable to include computer objects having a close relation and having a high possibility of being simultaneously used into one group as much as possible.

Further, the color-object relation can be divided into two types of relations of the color-color numerical value relation and color numerical value-object relation by interposing the quantity called the color numerical value between the colors and computer objects. By doing this, the handling in the computer 10 becomes easier. This will be explained with reference to FIG. 3 to FIG. 5.

FIG. 3 is a color-color numerical value correspondence table 101 expressing the color-color numerical value relation in a tabular form, while FIG. 4 is a color numerical value-object correspondence table expressing the color numerical value-object relation in a tabular form. In FIG. 3, the colors of the left column 101a are the same as the colors of the left column 100a explained in FIG. 2, while the computer objects of the right column 102 of FIG. 4 are the same as the computer objects of the right column 100b of FIG. 2. It is possible to combine the two correspondence tables by color numerical values present in both the correspondence tables 101 and 102. In the color-color numerical value correspondence table 101, the color numerical values are shown in the right column 101b, while in the color numerical value-object correspondence table 102, the color numerical values are shown in the left column 102a. The relation between colors and computer objects obtained as a result of joining these correspondence tables 101 and 102 is exactly the same as the relation shown in FIG. 2.

Figure 5:
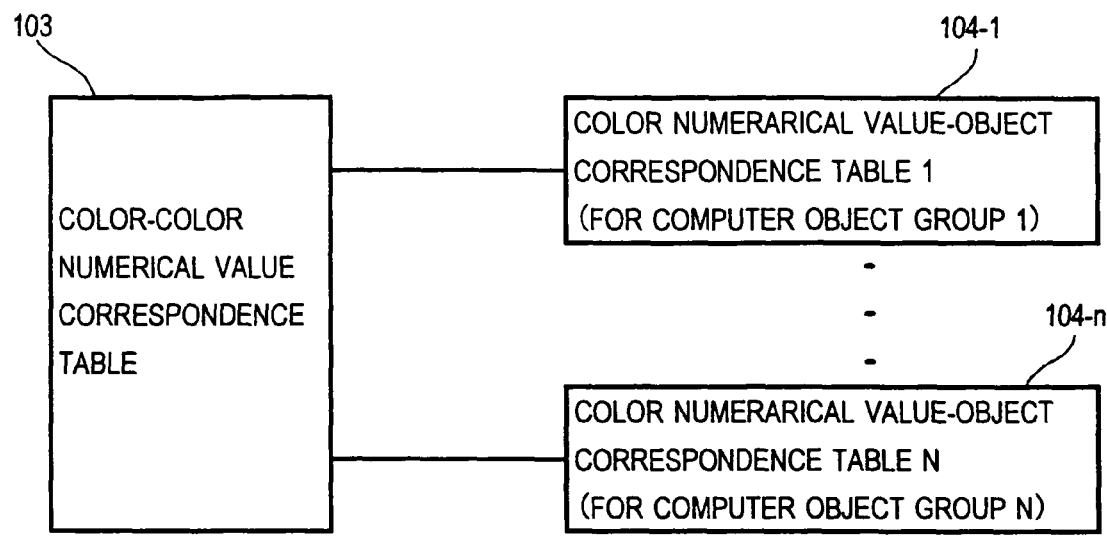
FIG. 5 is a view of a plurality of correspondence tables of a color numerical values and object.

When there are a plurality of correspondence tables in FIG. 2, as shown in FIG. 5, it is sufficient to create a plurality of (in the illustrated example, n number in general) color numerical value-object correspondence tables 104-1 to 104-n for one color-color numerical value correspondence table 103. At this time, colors are assigned to each of the color numerical value-object correspondence tables (1 to n) 104-1 to 104-n.

If there are a large number of computer objects and the total number n of the groups expressed by the color numerical value-object correspondence table (here referred to as "first hierarchal groups") exceeds the above-mentioned maximum color resolution, or for convenience in arrangement of the computer objects, the first hierarchal groups are further divided into groups (the groups of the first hierarchal groups being referred to as "second hierarchal groups" and the number of first hierarchal groups included in each of the second hierarchal groups are kept from exceeding the maximum color resolution. When the number of computer objects becomes further higher, third and fourth hierarchies may be suitably created. In normal processing in the computer 10, the above color numerical values are used. They are converted to colors only when outputting them as color entities. Due to this, the processing in the computer 10 becomes simpler. Further, when recording and outputting data and information on and from the recording medium in a form other than color entities or when transmitting them to another computer 16 through the communications device 15, it is suitable to use color numerical values.

Figure 6A:
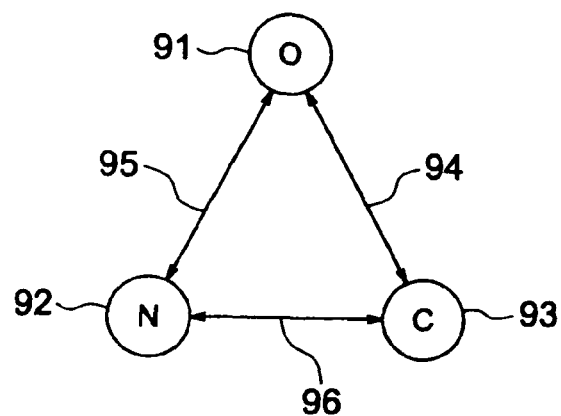
FIG. 6A is a view of the cyclic relations of a computer object, color numerical value, and color.

FIG. 6A shows the relation among a computer object (O), a color numerical value (N), and a color (C) of a color entity. As shown in FIG. 6A, the three computer object 91, color numerical value 92, and color entity color 93 are inter-convertible. The arrows 94, 95, and 96 in the figure shows the inter-convertibilities. In the inter-convertible relations 94, 95, and 96, the inter-convertible relation by the arrow 95 linking the computer object 91 and the color numerical value 92 is the above-mentioned color numerical value-object relation, the inter-convertible relation by the arrow 94 linking the computer object 91 and the color 93 is the above-mentioned color-object relation, and the inter-convertible relation by the arrow 96 linking the color numerical value 92 and the color 93 is the above-mentioned color-color numerical value relation. The interrelation among the three is called the "cyclic object relation" here.

Figure 6B:
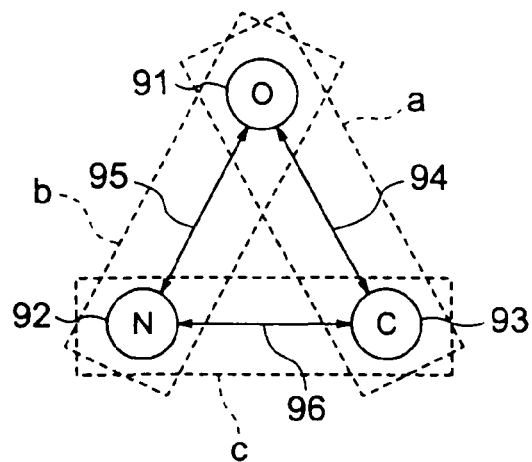
FIG. 6B is a view of a pair (or set) relation including any two components in the cyclic relations of a computer object, color numerical value, and color.

For the above-mentioned cyclic object relation, as shown in FIG. 6B. three sets or pairs (a, b, c) can be made by forming a set (or pair) combining any two of the computer object (O), the color numerical value (N), and the color (C) of a color entity. The set a is one made by the computer object 91 and the color 93 based on the color-object relation 94. The set b is one made by the computer object 91 and the color numerical value 92 based on the color numerical value-object relation 95. The set c is one made by the color numerical value 92 and the color 93 based on the color-color numerical value relation 96.

Figure 6C:
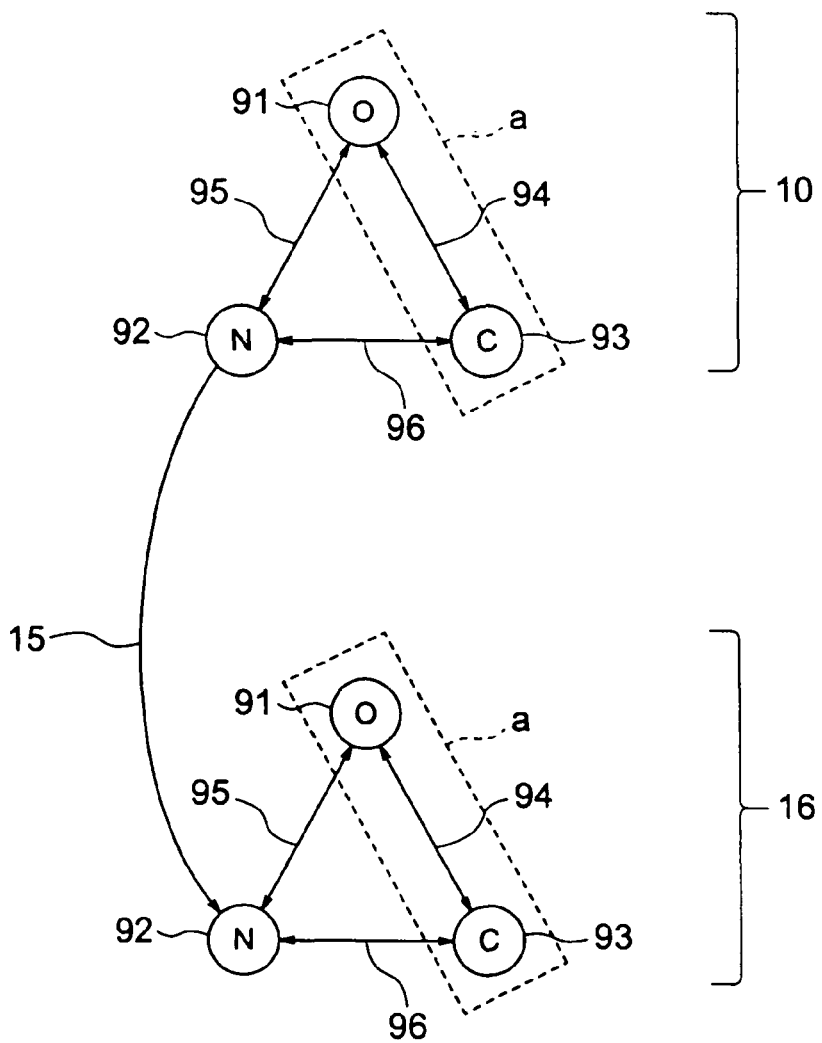
FIG. 6C is a view of the relation between two computers when utilizing the colors as the codes in sending/receiving information between the two computers.

When carrying out a communication for sending/receiving data between the computer 10 and the other computer 16 through the communication device 15 as shown in FIG. 1, in order to utilize the color numerical value as codes in sending/receiving the data, both of the computers 10 and 16 must have the relations shown in FIG. 6C. Namely, in order that data transmission from the computer 10 to the computer 16 through the communication device 15 should be carried out by means of the codes utilizing the color numerical values, both of the computers 10 and 16 are necessary to have the above-mentioned set a and the same relation defined in the conversion relation.

Further the above-mentioned relation shown in FIG. 6C is not limited to only the relation between the computers 10 and 16, and is further applicable to the relation between the computer 10 and each of the printer 21 and the other devices 23 etc. being the output/input device connecting to the computer 10 in the case of sending/receiving the information as codes between them.

Selecting any one of the sets a, b, and c so that the different computers have the same conversion relation, and selecting combinations of the sets or the configuration of the conversion relation based on the sets can be optional.

Further, in the communication or processing between the computers 10 and 16, instead of the communication device 15, the other recording media such as the FDD and HDD can be used. In this case, the above-mentioned configuration can be used similarly.

Next, an explanation will be given, referring to FIG. 7, of the routine in the computer 10 for converting and recording a computer object to a color entity or color numerical value in format or transmitting it over a communications path and regenerating the same.

When the computer 10 is given one or more sets of data or information (data or information: alphanumerics, symbols, graphics, mathematical formulas, images, audio, etc.) recorded on the recording medium 60, the computer 10 reads them by the above-mentioned input/output device 112. The data and information read by the computer 10 is shown as the computer object 113 in the computer 10. The computer object 113 is either immediately processed or stored once in the auxiliary storage 13. The block 114 in the auxiliary storage 13 computer object shows the state of storage.

Next, the CPU 11 converts the computer object 113 to a color numerical value 115. In the CPU 11, the color numerical value-object converter 116 is realized based on a program stored in the above-mentioned main storage 12 (not shown in FIG. 7). The color numerical value-object converter 116 uses the color numerical value-object correspondence table 102 stored in the auxiliary storage 13 to convert the computer object read or stored in the auxiliary storage 13 to a color numerical value 115. When recording data and information as a color numerical value or when transmitting information, the color numerical value 115 itself is output or transmitted through the input/output controller 14. That is, it is output through the input/output controller 14 and the data input/output controller 117 as the recorded color numerical value 118 and is output through the input/output controller 14 and information communications unit 119 with another computer as the transmitted color numerical value 120.

Further, when recording data and information as a color entity, the color-color numerical value converter 121 is realized in the CPU 11 by a program stored in the main storage 12. The color-color numerical value converter 121 uses the color-color numerical value correspondence table 101 stored in the auxiliary storage 13 to convert the color numerical value 115 to color and outputs the color entity 123 through the input/output controller 14 and color input/output device 122.

Conversely, when the color entity 123 is input, the color entity of each color dot is read by the input device portion of the color input/output device 122, for example, a CCD camera 51 or other input device, and input as color through the input/output controller 14. The color-color numerical value converter 12 in the CPU 11 converts the input color to a color numerical value 115 using the color-color numerical value correspondence table 101 of the auxiliary storage 13. The obtained color numerical value 115 is further converted to a computer object 113 by the color numerical value-object converter 116 in the CPU 11 using the color numerical value-object correspondence table 102 of the auxiliary storage 13 and thereby regenerated. The regenerated computer object 113 is output from the output device 124 as the regenerated data/information 115 and provided for use.

The color numerical value 115 converted from the color entity 123 may be recorded as it is or may be transmitted to another computer by a communications means. Further, when regenerating a color numerical value transmitted from another computer by communications or a color numerical value input from the data input/output device 117 as data/information, the same type of routine is followed as when regenerating a color numerical value converted from a color entity.

Figure 7:
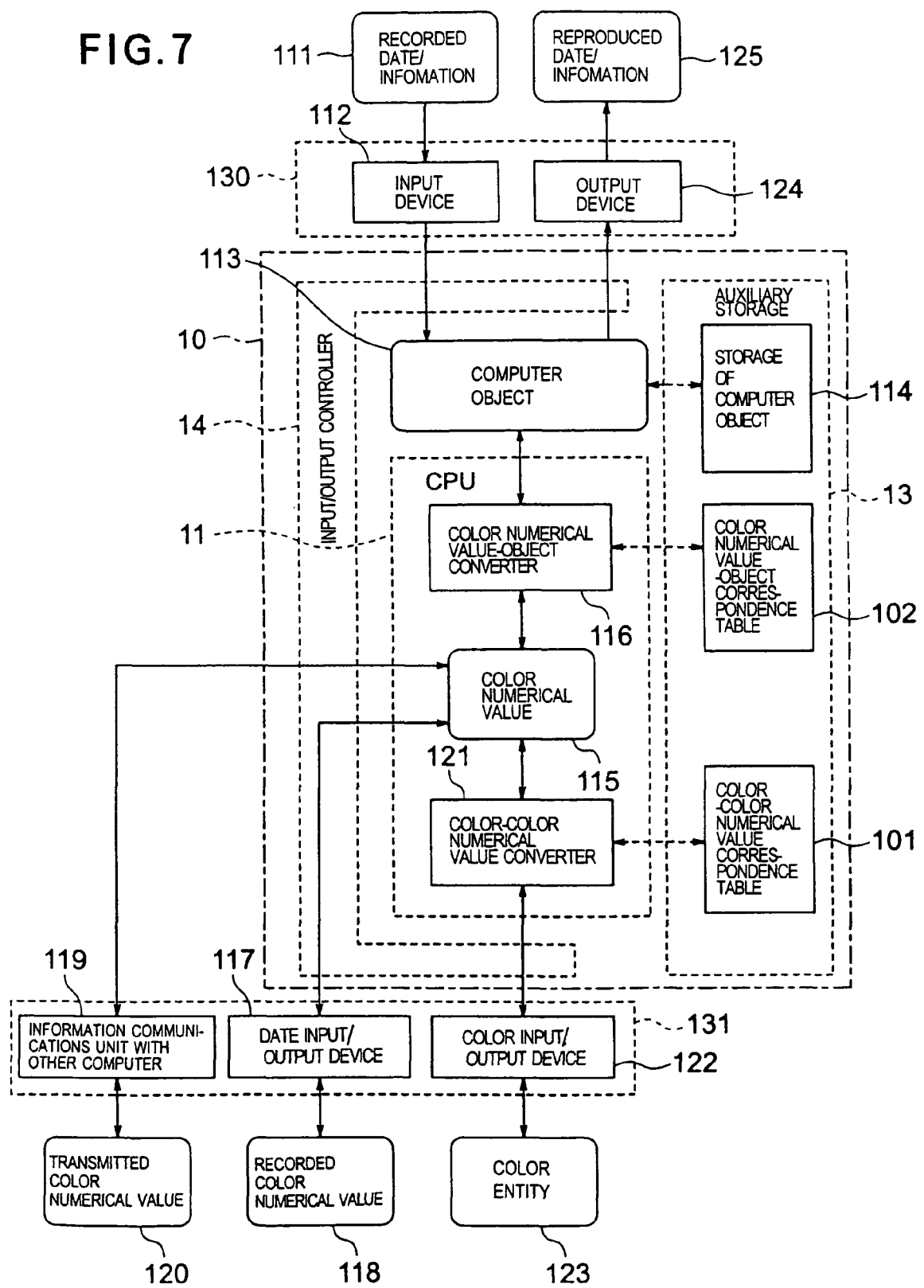
FIG. 7 is a block diagram of an example of the routine for input and output of a computer object.

In the configuration shown in FIG. 7, the input/output device 130 of the computer object 113 includes an input device 112 and output device 124 as explained above, but the necessary one may be used in accordance with the application. The input/output device and information communications unit 131 of the color entity or color numerical value include the color input/output device 122, data input/output device 117, and information communication unit 119 with another computer. The necessary one can be used in accordance with the application.

Next, an explanation will be given of the configuration relating to "selection" referring to FIG. 8. Here, "selection" means processing for not transmitting or not receiving unnecessary data through the data input/output device or communications device (including communications line). In this selection, as shown in FIG. 8, a filter 141 called a color filter is provided in the CPU 11. FIG. 8 is a view showing the portion relating to the color filter in FIG. 7. The portion of the functions shown in FIG. 7 is configured as required. Therefore, in FIG. 8, elements substantially the same as elements shown in FIG. 7 are assigned the same references.

The filter 141 shown in FIG. 8 selects the data input and output as the color numerical values 118 through the data input/output device 117 at the time of input and output of data with the outside based on the filter correspondence table 142 stored in advance in the auxiliary storage 13. The filter correspondence table 142 stores the color numerical values which can be received and other data. When a series of color numerical value data are input to the CPU 11 from the outside, the filter 141 refers to the filter correspondence table 142. When including a color numerical value not present in the filter correspondence table 142, it judges the series of color numerical values to be invalid and does not perform processing for conversion to a computer object or color. Further, it is possible to insert color numerical values which cannot be received in the filter correspondence table 142. In this case, conversely from the above, the filter 141 judges the series to be invalid when including a color numerical value included in the filter correspondence table. Further the filter correspondence table 142 may include both possible color numerical values and impossible color numerical values. By using a filter correspondence table having this configuration, invalid data can be eliminated when unnecessary data is mixed in or data is modified on the communications path, input/output path, or other paths.

In one computer object group or between a plurality of computer object groups belonging to a higher hierarchy computer object group, the individual items, content, properties, amounts, sizes, and other attributes are common. Further, it is possible to designate the same computer object as a "common object". By using a common object to express a computer object, it is possible to express a computer object more simply. At this time, the color or color numerical value corresponding to the common object are determined as a "common color" and "common color numerical value". The above-mentioned cyclic relation is defined between them. Based on the cyclic relation, the common objects, common colors, common color numerical values are handled inter-converted.

Figure 11:
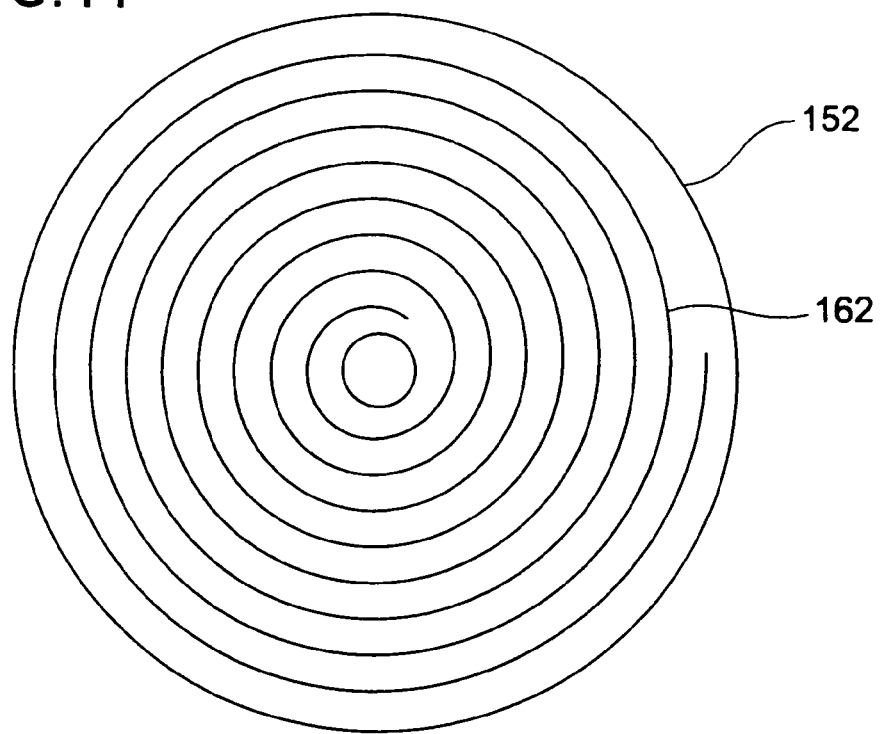
FIG. 11 is a conceptual view of an example of the method of arrangement of display elements on a circular recording medium.
Figure 12:
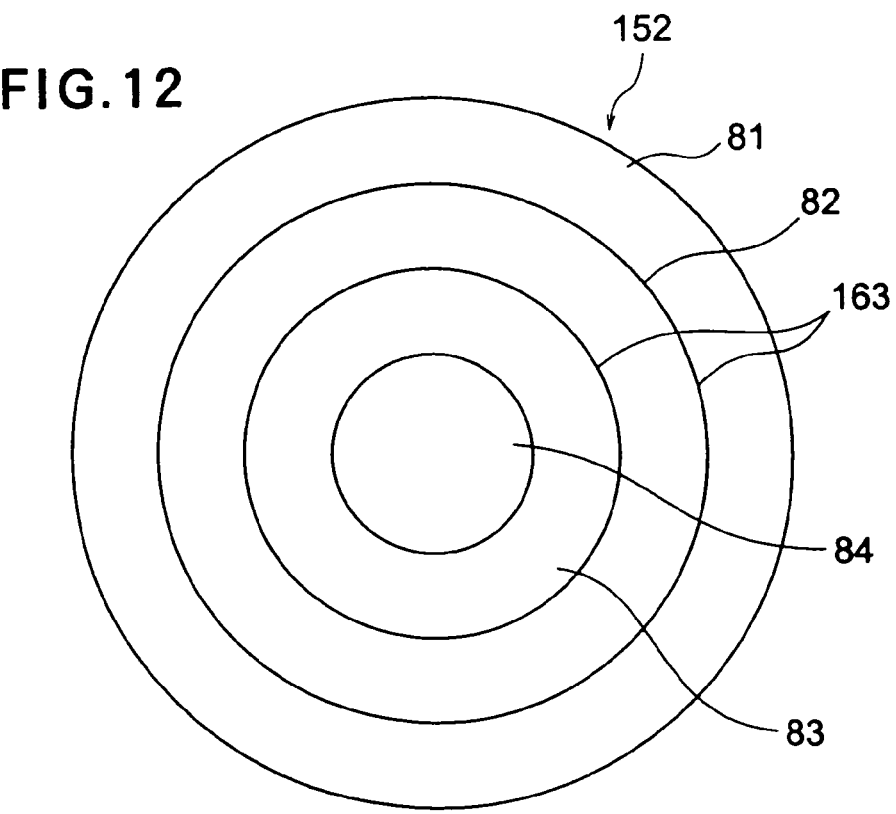
FIG. 12 is a view of another example of the method of arrangement of display elements on a circular recording medium and shows assignment areas.

Next, the recording medium will be explained. The recording medium will be explained as the recording medium 60 in FIG. 1. As an example of the recording medium 60, paper 61, plastic 62, glass 63, wood 64, etc. may be mentioned. The recording medium can take any shape, for example, a square shape or circular shape. FIG. 9 shows a square shaped recording medium 151, while FIG. 10 shows a circular shaped recording medium 152. The recording surfaces of the recording media 151 and 152 have pluralities (large numbers) of color entities 161 arranged on them. As the method of arrangement of color entities 161, arrangement in vertical and horizontal lines is the general practice in the case of the square shaped recording medium 151 and arrangement in a spiral array 162 as shown in FIG. 11 or in concentric circles (or concentric ellipses) as shown in FIG. 12 the case of the circular shaped recording medium 152. It is possible to select the shape of the recording medium or the method of arrangement of color entities in accordance with the characteristics of the recording medium or input/output device used.

One recording surface of the recording medium can be used divided into several areas in accordance with the objective. For example, the recording media 151 and 152 shown in FIG. 9 and FIG. 12 are divided into the control areas 81, storage areas 82, and security areas 83. Further, in the recording medium 152 shown in FIG. 12, an auxiliary area 84 is provided at the center portion in addition to these three areas.

In the above the control area 81 is an area giving control information for enabling information to be transmitted with another computer using the recording medium alone or a telephone line or other communications line. For example, when there are a plurality of color-object relations or color numerical value-object relations and a plurality of hierarchies, the information of the hierarchies or control information on what color numerical value-object relation is used for the data is stored in this control area 81. The storage area 82 is an area recording the color entities corresponding to the computer objects. The security area 83 stores security information for simple and easy recording and reproduction and avoiding replication. This functions to prevent an unauthorized person from reading and replicating the color entities. The auxiliary area 84 is an area storing the information required for recording, reproduction, input/output, etc. of color entities. All of these areas basically store information based on the color entities. What meaning they are given is determined with each time of use.

Figure 13:
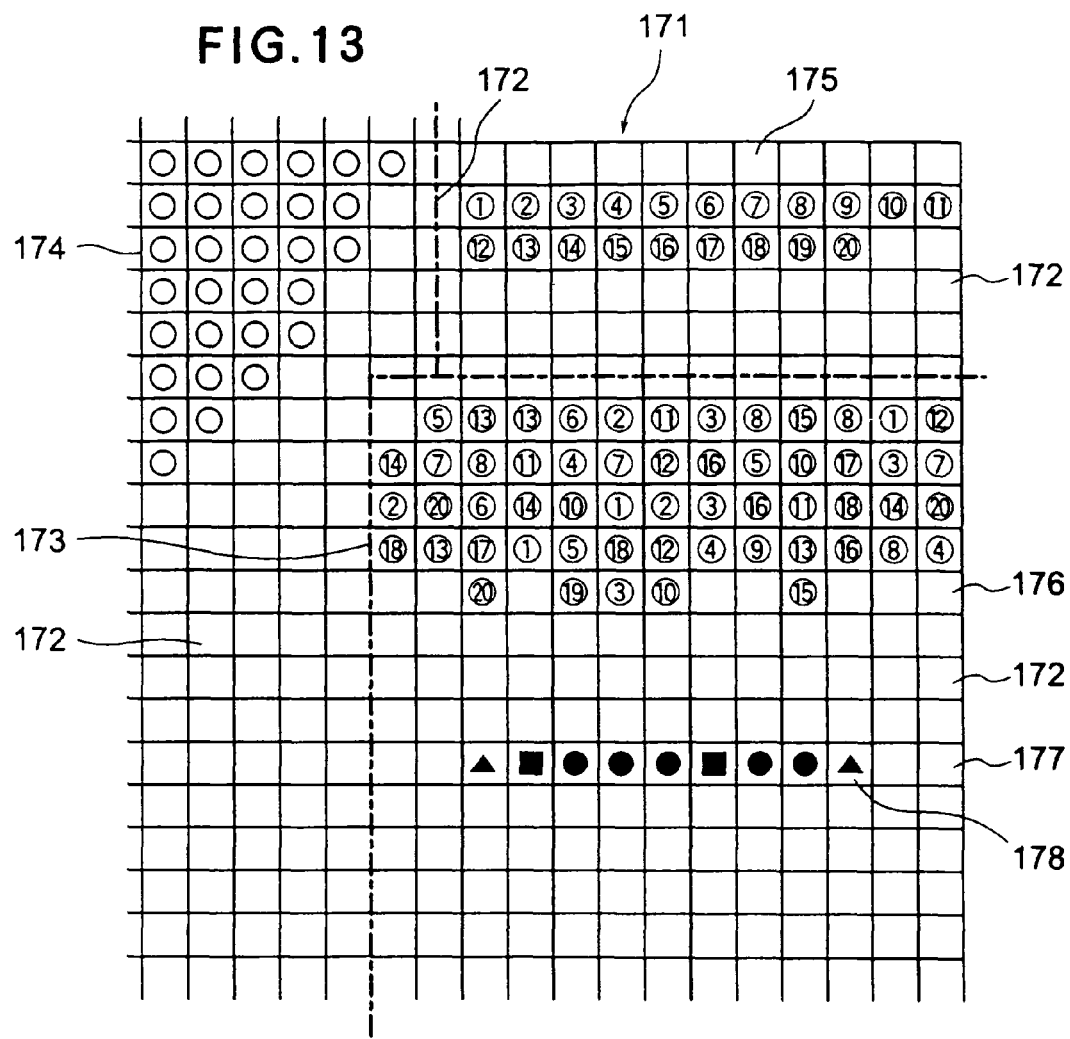
FIG. 13 is a view of an example of the display of a recording medium displaying a color entity.

FIG. 13 shows the state of color entities on a recording medium. In FIG. 13, a square recording medium 171 is shown. The dot array shows an example of arrangement on vertical and horizontal lines. Individual dots are shown printed with color entities by circle marks either hollow or containing numbers. The large number of squares 172 drawn on the surface of the recording medium 171 are divided into several portions by the one-dot chain lines 173 to show the different states of color entities. The portion shown by 174 is comprised by a hollow circle mark. This circle mark is equivalent to the state where there is no correspondence with a computer object and a color entity is not printed and shows the position of a dot in which a color entity is arranged. Circle marks with numbers (circle 1, circle 2, etc.) show color entities linked with computer objects, that is, specifically showing some sort of computer object. 1, 2, 3 . . . show the normal order of arrangement of information. In the portion shown by 175, the color entities are arranged in their inherent order. In this case, a series of meaningful information is obtained if reading the color entities in the order of their arrangement. The portion shown by 176 is an example of an arrangement different from the inherent order of information. The information on the arrangement is provided in the above-mentioned security area 83. When reading color entities arranged as in portion 176, first the color of the color entities is input in the order of arrangement, then the arrangement order information of the security area 83 is used to rearrange the order and thereby regenerate the original computer object. Here, the arrangement order information stored in the security area 83 is not limited to information directly indicating the arrangement of the color entities. The information may also be given as a color object and expressed as a color object. By arranging entities as shown in the portion 176, a person not given the arrangement order information cannot regenerate the computer object from the color entity and therefore the same action is given as with encoding information.

The portion shown by 177 is an example of a combination of an attribute other than color with the color entities. The black triangle mark 178 etc. has a shape or other attribute in addition to the color attribute. By combining a plurality of attributes and colors in this way, it becomes possible to increase the amount of information which can be expressed by 1 dot.

Figure 14:
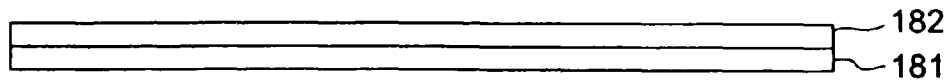
FIG. 14 is a side view of a recording medium having a first example of a configuration for preventing discoloration of a color entity.
Figure 15:
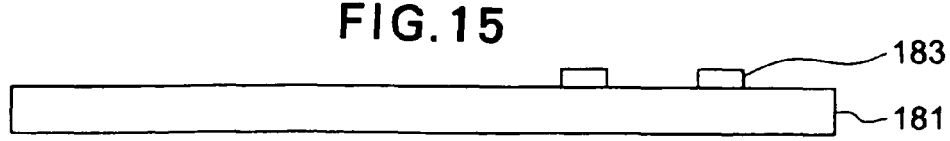
FIG. 15 is a side view of a recording medium having a second example of a configuration for preventing discoloration of a color entity.

FIG. 14 and FIG. 15 are side views of recording media showing examples of method for preventing discoloration of color entities. In the example shown in FIG. 14, the entire surface of the recording medium 181 on which the color entity is printed is provided with a discoloration prevention film 182. In the example shown in FIG. 15, the discoloration prevention film is provided only on the portion of the surface of the recording medium 181 printed with the color entity.

The embodiments explained with reference to the drawings are merely examples. The present invention is not limited to these embodiments and may be modified in any manner within the scope of the invention.

As clear from the above explanation, according to the present invention, there are the following effects since one color is assigned to each computer object and that color used to record the computer object. It is possible to record more than 1 bit of data for the 1 dot of the minimum unit of recording and possible to easily record a large amount of information. As the recording medium, it is possible to use paper or another inexpensive medium. Therefore, the invention is superior in economy. It is also possible to reduce the space for recording or storage. Storage of paper books etc. therefore becomes easy. In the music, image, video, and other entertainment fields, data can be recorded and reproduced extremely inexpensively. It becomes possible to record data and information cheaply and simply per unit space. There is the advantage of a large effect of storage and compression of information and data. Replacement of expensive storage devices becomes inexpensive and simple as well. The multiplexing and hierarching of the color-object relation also give rise to an effect of data compression. Further, information cannot be extracted without the correspondence tables, so there is the effect of copyright protection of the recording medium itself. By using this recording medium, use as an external storage of a computer also becomes possible. The invention enables transmission of a large amount of information to a large number of receivers and free selection of information and reduces the material sent. There is also a large effect of reduction of the amount of dots used due to selective use of ordinary symbols and colors and color numerical values. By using a correspondence table, there is the large effect of reduction of the colors and color numerical values transferred and transmitted compared with a computer object. There is therefore the advantage of encoding from the viewpoint of protection of data.

CAPABILITY OF UTILIZATION IN INDUSTRY

As explained above, the present invention expresses a computer object using color, records, reproduces, transmits, and records large amounts of information by color, and uses an inexpensive recording medium so is more economical.

What is claimed is:

1. A method of communication of a computer object among a plurality of computers, comprising:

transmitting the computer object over a network or transferring it by a data storage medium using a color numerical value; and regenerating from a received color numerical value the computer object or color in accordance with need using a correspondence of color numerical values and computer objects or correspondence of colors and color numerical values, and thereby not handling the computer object itself over the communication path or transfer path.

2. An apparatus for recording and/or reproducing a computer object, comprising:

a color filter for judging the possibility of acceptance by all or a specific part of the series of colors or color numerical values input by transmission, transfer, recording, and reproduction of computer objects and performing different processing when acceptance is possible and when acceptance is not possible.

3. An apparatus for recording and/or reproducing a computer object as set forth in claim 2, wherein the filter provides a filter correspondence table comprised of a list of colors or color numerical values and compares an input color or color numerical value against the filter correspondence table to judge if acceptance is possible.

4. An apparatus for recording and/or reproducing a computer object as set forth in claim 2, wherein the color filter further includes a means for displaying data for determination of processing when judging if acceptance is possible for a series of colors or color numerical values or performing processing for returning the data by transmission, transfer, and reproduction.

5. A method of recording a computer object, comprising:

newly establishing a color-object relation or color numerical value-object relation when linking a computer object to each of a plurality of colors or color numerical values when there are a plurality of color entities or color numerical values output in advance or determined for output.

* * * * *